Oct. 16, 1951  A. G. BROWN  2,571,415
PERCENTAGE INDICATOR FOR SCALES AND THE LIKE
Filed June 24, 1947  3 Sheets-Sheet 1

Inventor
Andrew G. Brown
by W. Bartlett Jones
Attorney.

Oct. 16, 1951 A. G. BROWN 2,571,415
PERCENTAGE INDICATOR FOR SCALES AND THE LIKE
Filed June 24, 1947 3 Sheets-Sheet 2

Inventor
Andrew G. Brown
by W. Bartlett Jones,
Attorney.

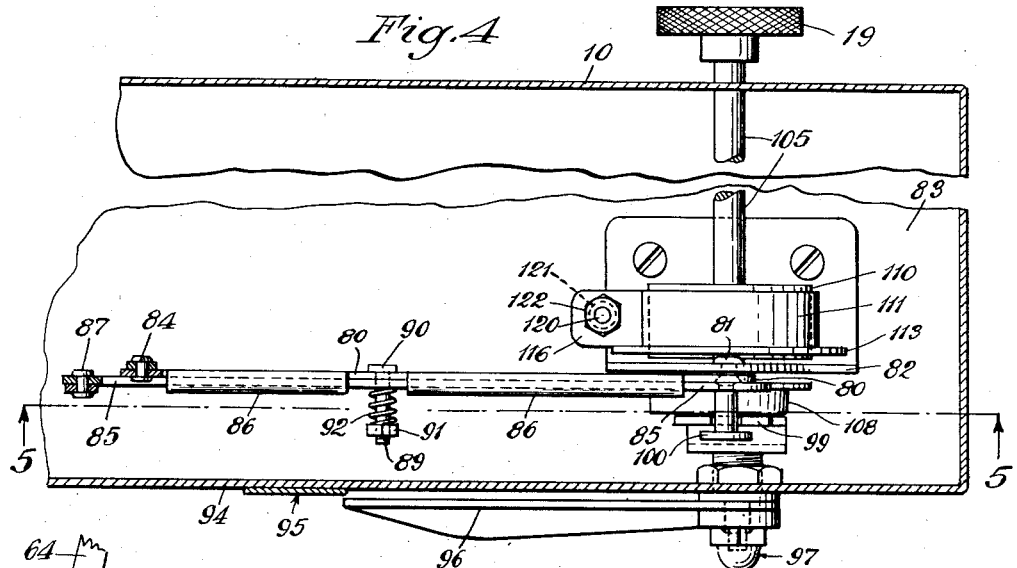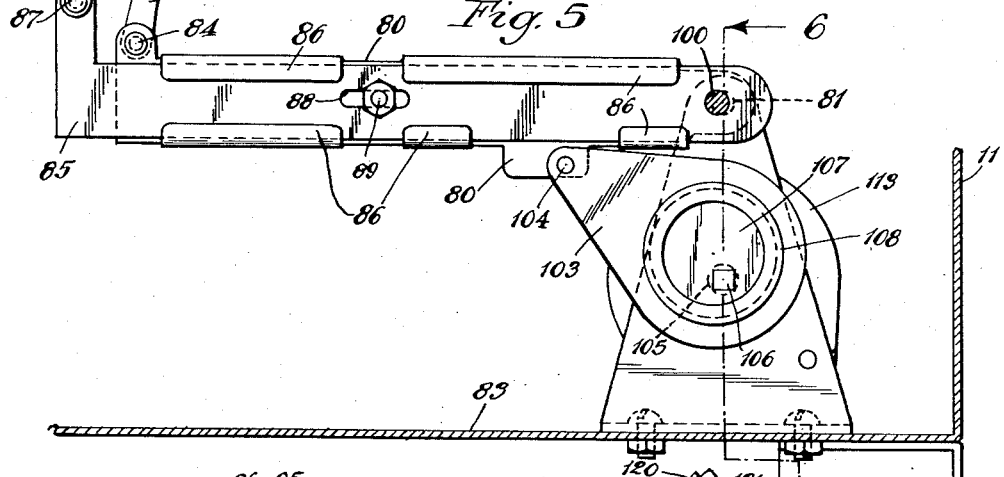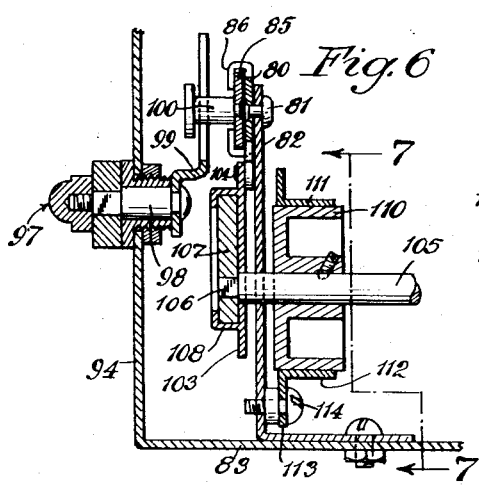

Patented Oct. 16, 1951

2,571,415

UNITED STATES PATENT OFFICE 2,571,415

PERCENTAGE INDICATOR FOR SCALES AND THE LIKE

Andrew G. Brown, Maywood, Ill., assignor to The Griffith Laboratories, Inc., Chicago, Ill., a corporation of Illinois Application June 24, 1947, Serial No. 756,638

17 Claims. (Cl. 116—129)

The present invention relates to weighing scales and in particular to a weighing scale suitable for use in pickling hams.

Percentage scales for pickling hams are now well known. They function to indicate the weight of a ham placed thereon, and by operation of an adjustable element which relatively moves two indicators and a dial therefor in such a way that one indicator registers a fixed percentage of the registration of the other indicator. In pickling hams the lowest registering indicator is moved to indicate the actual weight of a ham on the dial, whereby the other indicator registers a certain percentage increase in that weight. Pickling salt solution is pumped into the ham while it is in a registering position on the scale until the increased weight of the ham brings the weight needle of the scale to a registration coinciding with the registration of the increased percentage indicator.

The present invention relates to mechanism for operating the percentage indicators and for regulating the percentage which is to be employed in use of the scale.

It is the general object of the invention to provide a percentage mechanism adapted for use on a substantially circular scale having equal graduations.

It is another object of the invention to provide a percentage mechanism in which the percentage deviation of the two indicators may be varied by a manual adjustment.

It is another object of the invention to provide a novel manual setting mechanism for the percentage mechanism to avoid jamming and manual limits in operation.

It is a particular object of the invention to employ a mechanism in which the percentage to be registered is effected by relatively changing the ratio of certain lever arms.

Various other and ancillary objects and advantages of the invention are contemplated by the embodiment illustrated in the drawings in which:

Fig. 3 is a horizontal cross-section of a portion of the weight-registering mechanism taken on the line 3—3 of Fig. 2.

Fig. 4 is an enlarged horizontal cross-section looking down onto Fig. 5 showing a portion of the adjustable lever-arm construction and mounting.

Fig. 5 is a vertical cross-sectional view taken on the line 5—5 of Fig. 4.

Fig. 6 is a vertical cross-section taken on the line 6—6 of Fig. 5 showing the mounting and related mechanism for the adjustable lever arms.

Fig. 7 is a vertical elevation of a portion of the device on line 7—7 of Fig. 6 showing the friction device for the manual setting shaft.

In general arrangement and construction the scale resembles prior art devices, and employs well-known elements found in the prior art with some modifications, however, as set forth with respect to the weighing platform in my copending application Serial No. 756,636, filed June 24, 1947, and as set forth with respect to the counterbalanced weight-registering drum and needle, in my copending application Serial No. 756,637, filed June 24, 1947.

Figure 1:
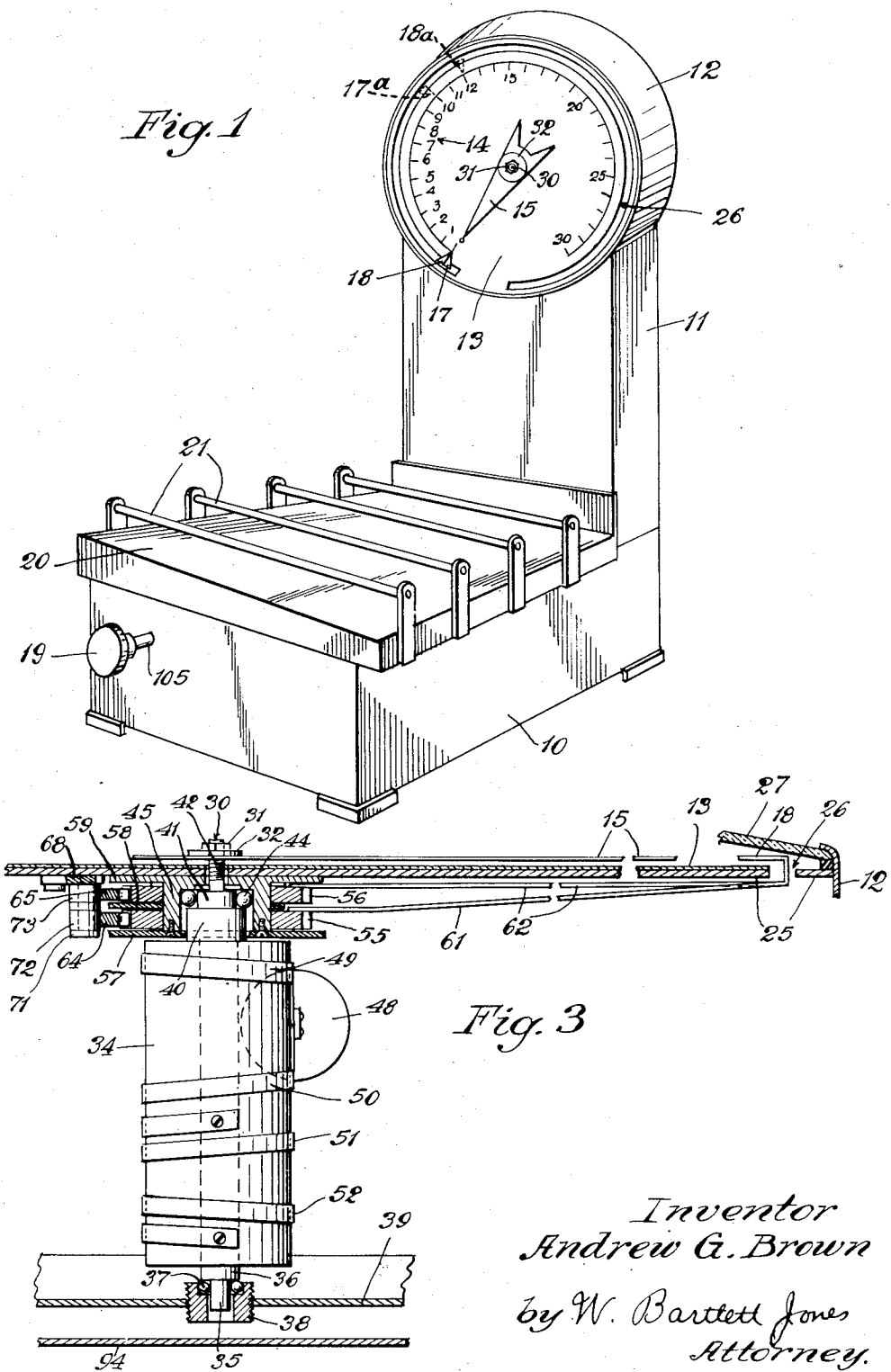
Fig. 1 is a perspective view of a scale embodying the present invention.

In Fig. 1 the scale has a base casing 10, and connected thereto an upright casing 11 at its rear, which casing 11 is topped by a rounded head or dial casing 12 presenting at the front a circular dial 13 with equal arcuate graduations 14 thereon circumferentially arranged behind weight indicator or needle 15. Percentage indicators in the form of pointers are indicated by the two triangular elements 17 and 18 shown in Fig. 1 in full lines as having come together at the zero point of the scale. These are also shown in dotted-line positions 17a and 18a registering at 18a a 20% increase of a 10-pound ham which is indicated by the pointer 17a. On the front of the casing 10 is a manually operated knob 19 which is turned by the operator to position the two pointers 17 and 18 at any spaced registration upwardly from zero on the dial 13. A feature of the present invention later to be described herein is the fact that the turning of the knob 19 is without a limit in either direction, thus not to be jammed. It operates in either direction to bring the percentage pointers to the desired place.

The scale mechanisms for causing weight needle 15 to register on dial 13 may be any conventional structures adequate to register the physical displacement of an inclined platform 20 having a grid 21 on which material is placed to be weighed. The inclined platform lets pickle liquor drain off. In accordance with the particular scale here described, the weighing platform 20 is substantially rigid except for its vertical displacement, by reason of the structure described in said co-filed application Serial No. 756,636.

Fig. 3 shows the principal parts of the weight-registering structure which is actuated by the displacement of platform 20 to effect registration by weight needle 15. The portions in Fig. 3 are briefly described because a portion of the percentage mechanism of the present invention is mechanically consolidated with the weight-registering structure.

The dial head 12 has a face plate 25 in which there is an arcuate slot 26 within which ride the percentage pointers 17 and 18. On the said plate 25 is mounted the dial 13. A cover glass 27 is indicated. The weight needle 15 is mounted on a shaft 30 by nut 31 over washer 32.

Shaft 30 is one of varying diameters having behind the plate 25 a drum portion 34, a reduced bearing portion 35 at the rear, and an enlarged shoulder-forming portion 36, which portion forms a runway for ball bearings 37 within a collar 38 threaded into a rear bracket plate 39 of the scale. The front end of the shaft 30 has reduced portions 40, 41 and 42, the latter being threaded for the nut 31, and the portions 40 and 41 forming a runway for ball bearings 44 in a bearing collar 45, which collar is secured to the face plate 25. Drum 34 has a counterbalancing weight 48 suspended thereto by converging tapes 49 and 50. Also on the drum are two similar tapes 51 and 52 winding in the opposite direction which are connected to tension link 53 (Fig. 2) for permitting displacement of the platform 20 to rotate the drum 34. The bearing collar 45 is cylindrical on its exterior to serve as a bearing for gears 55 and 56 mounted between spacer plates 57, 58 and 59. These two gears carry respectively arms 61 and 62, best shown in Figs. 2 and 3, which terminate in the percentage pointers 17 and 18. Against the gear 55 and 56 are two operating racks 64 and 65 which are rack-toothed terminal ends of links connected to the effective lever arms later described. Keeper means is provided to hold the racks 64 and 65 in meshing contact with the respective gears 55 and 56. The keeper comprises an arm 68 (Fig. 2) pivoted at 69 to the face plate 25 and drawn by spring 70 against the racks. A pin 71 mounted in the keeper arm 68 bears rollers 72 and 73 respectively pressing against the backs of racks 64 and 65.

The mechanism to move links 64 and 65 for positioning the pointers to indicate percentage registration on the dial, is effected by movement of a lever system having two related lever arms of different effective lengths, which act directly on the links 64 and 65. The said effective lengths may be variable in ratio. The preferred arrangement for compactness within the scale body described, is to provide a main rocking-lever arm 80 on fixed pivot 81 mounted in bracket 82 secured to the base 83 of the scale. The free end of lever 80 is pivoted at 84 to link 65. Slidable on lever arm 80 is a flat element 85 fitting under turned-over flanges 86 of lever 80. A pivot 87 joins link 64 and element 85 to establish a variable lever-arm length according to the adjustment. There is a slot 88 in lever element 85 for the shank 89 of a bolt 90 fixed in lever 80 and having nut 91 compressing spring 92 over said shank to make a tight but sliding fit between the two effect levers.

Figure 2:
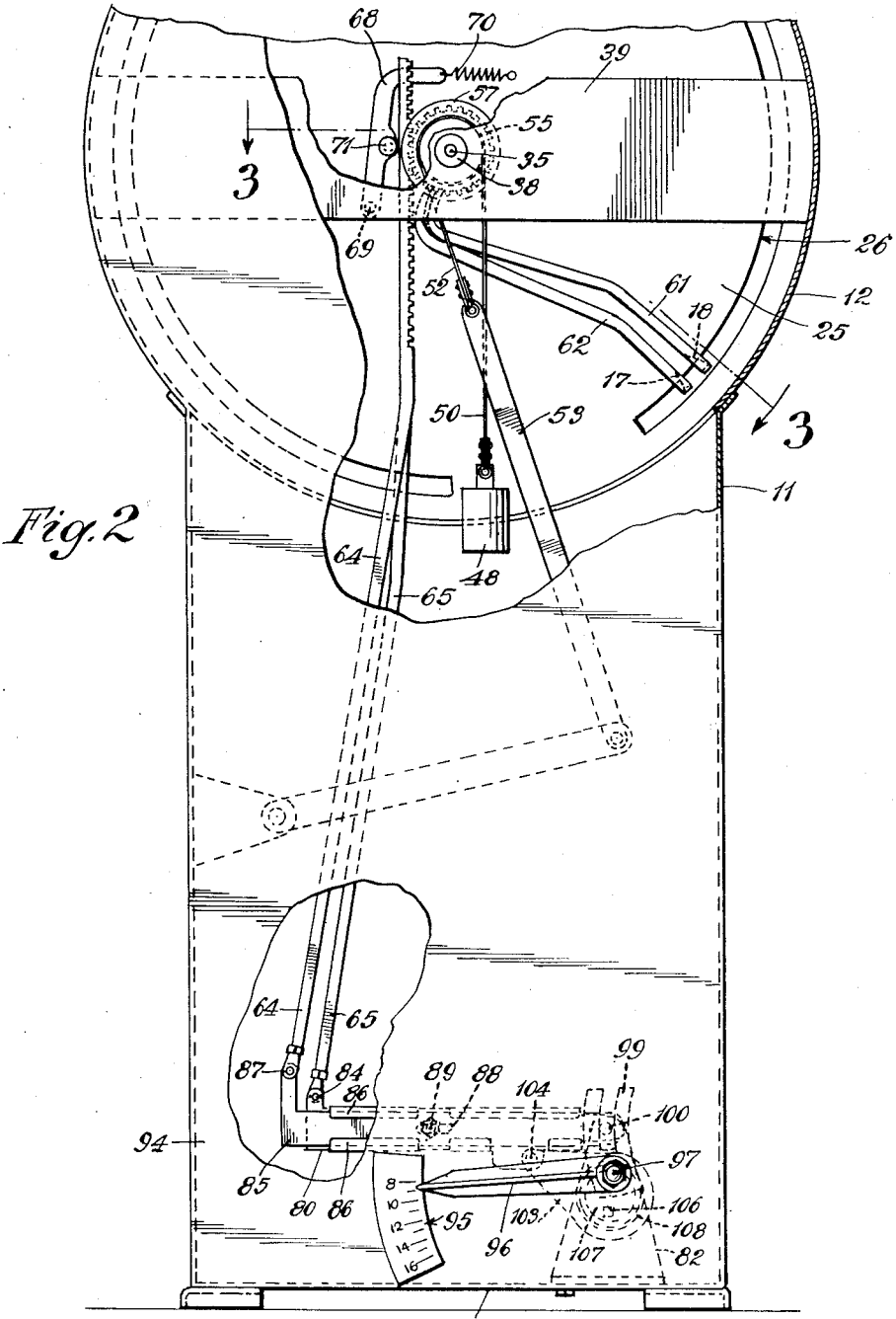
Fig. 2 is a vertical view of the rear of the scale with fragmentary portions of the back plate indicated as removed.

Various arrangements may be employed to change the position of lever element 85 on lever 80. A convenient device comprises a percentage-setting control on the back wall 94 of the scale as best shown in Fig. 2. There is a scale 95 calibrated in percentage, and a movable control 96 therefor on axis 97. A rotary shank 98 is mounted in the back wall 94 and rigidly carries on the outside a pointer 96 and on the inside a forked arm 99, extending generally vertically. The forked arm 99 encompasses a stud 100 mounted on the slidable lever element 85, there being appropriate clearance to permit the stud 100 to ride freely in the slot during the rocking cycle. Preferably the center of stud 100 remains on the same side of rocking axis 81 in all useful adjustments of the percentage.

The manual control 19 (Fig. 1) for moving the percentage pointers is arranged so that one rotation carries the lever system through one rocking cycle. Thus, the pointers 17 and 18 will move from registry at zero upwardly to their limits and return to zero during this one rotation of knob 19. Numerous mechanical devices may effect this relationship. An illustrative device comprises an operating link plate 103 pivoted at 104 to lever 89. It has a "crank" type of connection to shaft 105 whose axis is parallel to lever axis 81, and whose forward end terminates in knob 19. Shaft 105 bears in bracket plate 82 and has its rear end squared as shown at 106. An eccentric 107 is fixed on shaft 105 by fit over said squared end 106. Link plate 103 has a circular housing or bearing 108 for said eccentric 107. Thus, one rotation of knob 19 acts on link plate 103 to rock the levers 80 and 85 in one cycle.

Fixity of position for the pointers 17 and upon positioning them by operating knob 19, is maintained by friction in the system. It is preferred to provide controllable friction by special means. Friction is exerted upon a drum 110 fixed on shaft 105 by two spring-pressed braking bands 111 and 112, mounted on plate 113 pivoted at 114 to bracket plate 82. The bands 111 and 112 terminate in spaced fingers 116 and 117, respectively, which are perforated to receive a threaded screw 120 having spring 121 between nut 122 and finger 116.

In operation, the friction drum 110 permits fixity of a chosen position of knob 19 and manual change of such position merely by turning the knob in either direction. There are no interfering limits or stops. Continuous turning rocks the lever 80 and moves pointer 17 back and forth between zero registration and a point near calibration 30. Thus, the knob 19 is used to move pointer 17 to coincide with the registration of weight needle 15 for a ham placed on the scale to be pickled.

By reason of the variable and greater length of lever arm 85, compared to lever arm 80, the pointer 18 moves with pointer 17, but always registers at a point which is a predetermined percentage above the registration of pointer 17. Thus, the pointer 18 indicates the position to which the weight needle must advance in pumping fluid into the ham to a predetermined percentage of the original weight of the ham.

Since hams vary in weight, each pickling operation may call for shifting pointer 17 to a new position. This is done by turning knob 19 in the appropriate direction. The rocking cycle eliminates the need for stops and avoids shocks and possible damage to the parts.

The scale, as a pickling scale for hams, may be used witthout ever changing the percentage-control finger 96, thus rendering the scale a fixed-percentage scale for hams of varying weight. Hence, for such limited purposes the device may be made with lever arms in fixed ratio, with considerable simplification in structure. Thus, the lever arm 80 may be considered as one rocking arm with two effective lever arm lengths, the ratio of which may be fixed or variable.

The mechanical details may be varied greatly considering preservation of sufficient accuracy in use for the purpose required.

Such changes and modifications are considered as falling within the scope of the invention as expressed in the appended claims.

I claim:

1. A percentage-indicating device comprising in combination an arcuate dial having uniform calibrations about a center, two pointers movable concentrically with said calibrations and arranged to register together at one position on the dial and to move simultaneously from said position in the same direction at speeds having a predetermined ratio, two concentrically mounted and movable elements carrying said pointers and having gear-toothed portions, two rack-toothed longitudinal-link members engaging said gear-toothed portions for effecting movement of said pointers, a pivoted rocking-lever arm connected at a fixed arm's length to one of said link members, a second coaxial lever arm longitudinally adjustable in a radially sliding position on said rocking-lever arm and connected at its adjustable arm's length to said other link member, the ratio of the effective lengths of said fixed and adjustable lever arms as connected to the link members controlling said predetermined ratio, a rotary manual control for rocking and positioning said lever arms to effect various registrations of said pointers, a positive connection between said manual control and said rocking levers arranged to effect one rocking cycle per revolution of said control, and an adjusting device for moving said second lever arm in predetermining its effective arm length and its position on the rocking-lever arm.

2. A percentage-indicating device comprising in combination an arcuate dial having uniform calibrations about a center, two pointers movable concentrically with said calibrations and arranged to register together at one position on the dial and to move simultaneously from said position in the same direction at speeds having a predetermined ratio, two concentrically mounted and movable elements carrying said pointers and having gear-toothed portions, two rack-toothed longitudinal-link members engaging said gear-toothed portions for effecting movement of said pointers, a pivoted rocking-lever arm connected at a fixed arm's length to one of said link members, a second coaxial lever arm rigid with said rocking-lever arm and connected at its adjustable arm's length to said other link member, the ratio of the effective lengths of said fixed and adjustable lever arms as connected to the link members controlling said predetermined ratio, a fully rotatable manual control for rocking and positioning said lever arms to effect various registrations of said pointers, and a positive connection between said manual control and said rocking levers arranged to effect one rocking cycle per revolution of said control.

3. A percentage-indicating device comprising in combination an arcuate dial having uniform calibrations about a center, two pointers movable concentrically with said calibrations and arranged to register together at one position on the dial and to move simultaneously from said position in the same direction at speeds having a predetermined ratio, two concentrically mounted and movable elements carrying said pointers and having gear-toothed portions, two rack-toothed longitudinal-link members engaging said gear-toothed portions for effecting movement of said pointers, a pivoted rocking-lever arm connected at a fixed arm's length to one of said link members, a second coaxial lever arm rigid with said rocking-lever arm and connected at its adjustable arm's length to said other link member, the ratio of the effective lengths of said fixed and adjustable lever arms as connected to the link members controlling said predetermined ratio, and manual control means for rocking and positioning said lever arms to effect any predetermined registrations of said pointers.

4. A percentage-indicating device comprising in combination an arcuate dial having uniform calibrations about a center, two pointers movable concentrically with said calibrations and arranged to register together at one position on the dial and to move simultaneously from said position in the same direction at speeds having a predetermined ratio, two longitudinal-link members for effecting movement of said pointers, positive connections from said two link members to said pointers arranged for translating linear movement of the link members to circular movement of the pointers, a pivoted rocking-lever arm connected at a fixed arm's length to one of said link members, a second coaxial lever arm longitudinally adjustable in a radially sliding position on said rocking-lever arm and connected at its variable arm's length to said other link member, the ratio of the effective lengths of said fixed and adjustable lever arms as connected to the link members controlling said predetermined ratio, manual control means for rocking and positioning said lever arms to effect any predetermined registrations of said pointers, and an adjusting device for moving said second lever arm in predetermining its effective arm length and position on the rocking lever arm.

5. A percentage-indicating device comprising in combination an arcuate dial having uniform calibrations about a center, two pointers movable concentrically with said calibrations and arranged to register together at one position on the dial and to move simultaneously from said position in the same direction at speeds having a predetermined ratio, two longitudinal-link members for effecting movement of said pointers, positive connections from said two link members to said pointers arranged for translating linear movement of the link members to circular movement of the pointers, a pivoted rocking-lever arm connected at a fixed arm's length to one of said link members, a second coaxial lever arm rigid with said rocking-lever arm and connected at its adjustable arm's length to said other link member, the ratio of the effective lengths of said fixed and adjustable lever arms as connected to the link members controlling said predetermined ratio, and a manual control means for rocking and positioning said lever arms to effect any predetermined registrations of said pointers.

6. A percentage-indicating device comprising in combination an arcuate dial having uniform calibrations about a center, two pointers movable concentrically with said calibrations and arranged to register together at one position on the dial and to move simultaneously from said position in the same direction at speeds having a predetermined ratio, two concentrically mounted and movable elements carrying said pointers and having gear-toothed portions, two rack-toothed longitudinal-link members engaging said gear-toothed portions for effecting movement of said pointers, a pivoted rocking-lever arm connected at a fixed arm's length to one of said link members, a second coaxial lever arm rigid with said rocking-lever arm and connected at an adjustable arm's length to said other link member, the ratio of the effective lengths of said fixed and adjustable lever arms as connected to the link members controlling said predetermined ratio, and a manual control means for rocking and positioning said lever arms to effect predetermined registrations of said pointers.

7. A percentage-indicating device comprising in combination a fixed dial having calibrations thereon, two pointers movable relatively to said calibrations and arranged to register together at one position on the dial and to move simultaneously from said position in the same direction at speeds having a predetermined ratio, two longitudinal-link members for effecting movement of said pointers, positive connections from said two link members to said pointers for translating linear movement of the link members to registering movement of the pointers, a pivoted rocking-lever arm connected at a fixed arm's length to one of said link members, a second coaxial lever arm rigid with said rocking-lever arm and connected at its adjustable arm's length to said other link member, the ratio of the effective lengths of said fixed and adjustable lever arms as connected to the link members controlling said predetermined ratio, and a manual control means for rocking and positioning said lever arms to effect any predetermined registrations of said pointers.

8. In a percentage-indicating device having two pointers capable of movement relative to a calibrated scale to indicate two values of predetermined ratio, a pivoted rocking-lever arm arranged to translate its rocking movement to movement of one of said pointers, a co-axial second lever arm of variable effective lengths arranged to translate its rocking movement to movement of the other pointer, said second lever arm being mounted on and radially movable along the first lever arm to vary the ratio of the two effective lever arms acting on said pointers, whereby said two arms move simultaneously in the same arc, manual means to move said rocking-lever arm to effect various positions of registry of said pointers, and means under manual control to change the position of said second lever arm on said rocking lever arm.

9. In a percentage-indicating device having two pointers capable of movement relative to a calibrated scale to indicate two values of predetermined ratio, a pivoted rocking-lever arm arranged to translate its rocking movement to movement of one of said pointers, a second lever arm arranged to translate its rocking movement to movement of the other pointer, said second lever arm being coaxial and rigid with said first lever arm, and manual means to move said rocking-lever arm to effect various positions of registry of said pointers.

10. In a percentage-indicating device having two pointers capable of movement relative to a calibrated scale to indicate two values of predetermined ratio, a pivoted rocking-lever arm arranged to translate its rocking movement to movement of one of said pointers, a second lever arm to translate its rocking movement to movement of the other pointer, said second lever arm being positively connected with said first lever arm to rock therewith to the same arcuate extent on a common axis, and manual means to move said arms simultaneously each in a predetermined arc to effect various positions of registry of said pointers.

11. In a percentage-indicating device having two pointers capable of movement relative to a calibrated scale to indicate two values of predetermined ratio, a pivoted rocking-lever arm arranged to translate its rocking movement to movement of one of said pointers, a second lever arm arranged to translate its rocking movement to movement of the other pointer, said second lever arm being positively connected with said first lever arm to rock therewith to the same arcuate extent on a common axis, manual means to move said lever arms simultaneously each in a predetermined arc to effect various positions of registry of said pointers, and means under manual control to change the ratio of pointer movements relative to a given manual rocking.

12. In a percentage-indicating device having two pointers capable of movement relative to a calibrated scale to indicate two values of predetermined ratio, a pivoted rocking-lever arm arranged to translate its rocking movement to movement of one of said pointers, a second lever arm of variable effective length arranged to translate its rocking movement to movement of the other pointer, said second lever arm being co-axially associated with said rocking lever arm to rock therewith, a rotary manual control shaft having its axis parallel to the co-axes of said lever arms, a link pivotally connected at one end to one of said lever arms to effect a cycle of rocking of said two lever arms each in a predetermined arc, and an eccentric rigid on said control shaft, said link having circular bearing on said eccentric, whereby one rotation of said control shaft effects said one rocking cycle.

13. In a percentage-indicating device having two pointers capable of movement relative to a calibrated scale to indicate two values of predetermined ratio, a pivoted rocking-lever arm arranged to translate its rocking movement to movement of one of said pointers, a second lever arm of variable effective length arranged to translate its rocking movement to movement of the other pointer, said second lever arm being co-axially associated with said rocking lever arm to rock therewith, a rotary manual control shaft having its axis parallel to the co-axes of said lever arms, a link pivotally connected at one end to one of said lever arms to effect a cycle of rocking of said two lever arms each in a predetermined arc, and a crank-type of connection from said control shaft to said link, whereby one rotation of said control shaft effects said one rocking cycle.

14. In a percentage-indicating device having two pointers capable of movement relative to a calibrated scale to indicate two values of predetermined ratio, a pivoted rocking-lever arm arranged to translate its rocking movement to movement of one of said pointers, a second lever arm of variable effective length arranged to translate its rocking movement to movement of the other pointer, said second lever arm being co-axially associated with said rocking lever arm to rock therewith, a rotary manual control shaft having its axis parallel to the co-axes of said lever arms, a link pivotally connected at one end to one of said lever arms to effect a cycle of rocking of said two lever arms each in a predetermined arc, an eccentric rigid on said control shaft, said link having circular bearing on said eccentric, whereby one rotation of said control shaft effects said one rocking cycle, and friction means acting to resist manual movement of the resulting mechanism.

15. In a percentage-indicating device having two pointers capable of movement relative to a calibrated scale to indicate two values of predetermined ratio, a pivoted rocking-lever arm arranged to translate its rocking movement to movement of one of said pointers, a second lever arm of variable effective length arranged to translate its rocking movement to movement of the other pointer, said second lever arm being co-axially associated with said rocking lever arm to rock therewith, a rotary manual control shaft having its axis parallel to the co-axes of said lever arms, a link pivotally connected at one end to one of said lever arms to effect a cycle of rocking of said two lever arms each in a predetermined arc, a crank-type connection from said control shaft to said link, whereby one rotation of said control shaft effects said one rocking cycle, and friction means acting to resist manual movement of the resulting mechanism.

16. In a percentage-indicating device having two pointers capable of movement relative to a calibrated scale to indicate two values of predetermined ratio, a pivoted rocking-lever arm arranged to translate its rocking movement to movement of one of said pointers, a second lever arm of variable effective length arranged to translate its rocking movement to movement of the other pointer, said second lever arm being co-axially associated with said rocking lever arm to rock therewith, a rotary manual control shaft having its axis parallel to the co-axes of said lever arms, a link pivotally connected at one end to one of said lever arms to effect a cycle of rocking of said two lever arms each in a predetermined arc, a crank-type connection from said control shaft to said link, whereby one rotation of said control shaft effects said one rocking cycle, and friction means acting to resist manual rotation of said control shaft.

17. In a percentage-indicating device having two pointers capable of simultaneous movement relative to a calibrated scale to indicate two values of predetermined ratio, two lever systems each arranged to translate its rocking movement to movement of one of said pointers, and a single manual means to rock both lever systems simultaneously to the same arcuate extent to effect various positions of registry of said pointers, whereby said pointers in every position of said manual means maintain registrations having said ratio.

ANDREW G. BROWN.

REFERENCES CITED

The following references are of record in the file of this patent:

UNITED STATES PATENTS

| Number | Name | Date |
| --- | --- | --- |
| 2,157,706 | Jones | May 9, 1939 |
| 2,186,830 | Hem | Jan. 9, 1940 |
| 2,355,350 | Williams | Aug. 8, 1944 |
| 2,438,202 | Burns | Mar. 23, 1948 |